(12) United States Patent
Kang

(10) Patent No.: US 7,185,161 B2
(45) Date of Patent: Feb. 27, 2007

(54) METHOD AND APPARATUS FOR SECURING DATA STORED ON A REMOVABLE STORAGE MEDIUM OF A COMPUTER SYSTEM

(75) Inventor: Seong Cheol Kang, Osan-si (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 10/303,719

(22) Filed: Nov. 26, 2002

(65) Prior Publication Data

US 2003/0149852 A1     Aug. 7, 2003

(30) Foreign Application Priority Data

Feb. 4, 2002    (KR) ..................... 10-2002-0006278

(51) Int. Cl.
*G06F 12/14*    (2006.01)
(52) U.S. Cl. ...................................... 711/164; 711/152
(58) Field of Classification Search .............. 711/103, 711/115, 163, 164
See application file for complete search history.

(56) References Cited

U.S. PATENT DOCUMENTS 5,623,637 A * 4/1997 Jones et al. ................. 711/164
6,282,612 B1 * 8/2001 Sakajiri et al. ............. 711/115
6,532,542 B1 * 3/2003 Thomlinson et al. ....... 713/187
6,687,825 B1 * 2/2004 Challener et al. .......... 713/176
6,738,877 B1 * 5/2004 Yamakawa et al. ......... 711/164

* cited by examiner

*Primary Examiner*—T Nguyen
(74) *Attorney, Agent, or Firm*—Fleshner & Kim, LLP

(57) ABSTRACT

A method or apparatus can reduce or prevent unauthorized data access by securing data stored on a hard disk of a computer system. The method can include requesting a user to enter a password if the computer system is powered on under the condition that a password for security of the hard disk of the computer system is previously stored and data previously written on the hard disk is converted into a specific format for security and stored on the hard disk of the computer system, determining whether the password entered by the user corresponds to the previously stored password, storing the determined result, and selectively reading and outputting the format-converted data stored on the hard disk upon the user requests according to the determined result. The requested data can be output to a monitor. User write operation requests can operate according to the determined result.

18 Claims, 3 Drawing Sheets

METHOD AND APPARATUS FOR SECURING DATA STORED ON A REMOVABLE STORAGE MEDIUM OF A COMPUTER SYSTEM

BACKGROUND OF THE INVENTION

1. Field of the Invention

The present invention relates to a method and apparatus for securing data of a computing system.

2. Background of the Related Art

A computing system, such as a desktop-type personal computer, notebook computer or the like, provide security functions. As an example of such a security function, upon booting of a related art computer system, a password entry window is displayed on a screen to allow a user to enter a password. The entered password is compared with a password previously entered and set by the user. An operating system of the computer system is run only when the two passwords are the same. In this manner, only an authorized user can gain access to the computer system.

However, a related art computer system employing such a security function has a disadvantage in that the security function protects only access to the computer system without respect to data stored in the computer system such as on a hard disk as an auxiliary storage unit. Thus, when the hard disk is detached from the related art computer system with the above-described security function and then mounted to a different computer system, data such as important documents etc. stored on the hard disk may be easily exposed to other persons.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method and apparatus that secures data on a removal storage device.

Another object of the present invention is to provide a method and apparatus that secures data in a data processing apparatus.

Another object of the present invention is to provide a method and apparatus that secures data on a hard disk of a computer.

Another object of the present invention to provide a method and apparatus that secures data stored on a detachable storage device of a computer system to prevent unauthorized users of the data or the computer system from interpreting data stored on the detachable storage device.

To achieve at least the above objects and other advantages in a whole or in part and in accordance with the purpose of the present invention, as embodied and broadly described herein, there is provided a system that includes a processor that operates application programs, and a removable storage device coupled to the processor and configured to store data accessible to the processor, wherein the removable storage device is provided a second password using the processor, and wherein the removable storage device is not responsive to data access request unless a first password associated with the data access request corresponds to the second password.

To further achieve at least the above objects and other advantages in a whole or in part and in accordance with the purpose of the present invention, as embodied and broadly described herein, there is provided a method for securing data stored on a hard disk of a computer system including requesting a user to enter a password when a password for security of the computer system is previously registered, wherein data to be written to the hard disk is converted into a specific format for security when stored on the hard disk of the computer system, determining whether the password entered by the user is the same as the previously registered security password and storing the determined result, reading the data stored on the hard disk in the specific format for security if the user requests it to be read from the hard disk, and processing the read data in different manners according to the determined result.

To further achieve at least the above objects and other advantages in a whole or in part and in accordance with the purpose of the present invention, as embodied and broadly described herein, there is provided a method for securing data stored on a hard disk of a portable computer system including converting data requested to be written by a user into a predetermined format for security when the user requests a write operation after booting of the computer system is completed, and storing the security format-converted data on the hard disk of the computer system.

To further achieve at least the above objects and other advantages in a whole or in part and in accordance with the purpose of the present invention, as embodied and broadly described herein, there is provided a method that includes enabling a computer system, selectively accessing encoded data stored in a first format in a detachable storage device, and outputting the data converted to a second format when a security code for the detachable storage device is matched.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
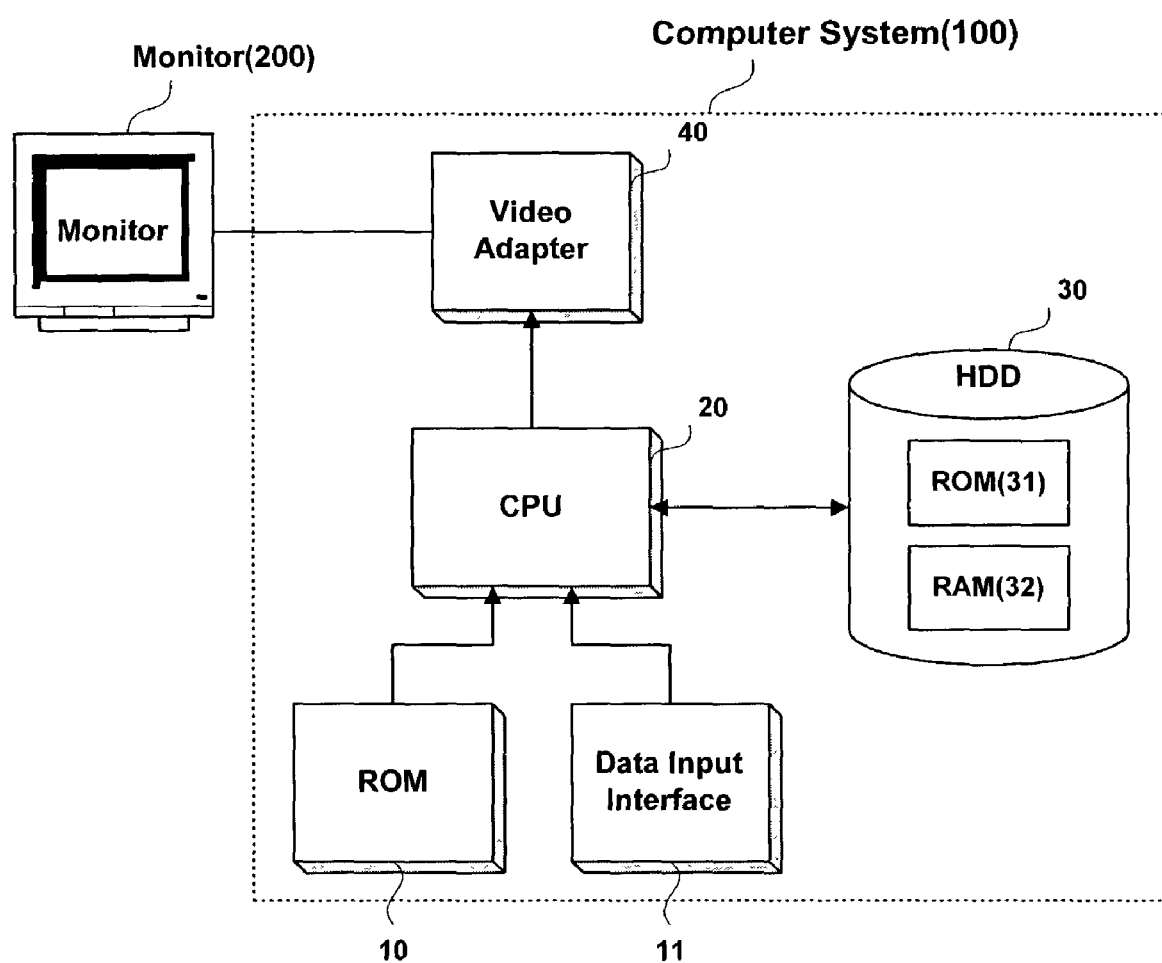
FIG. 1 is a block diagram showing a preferred embodiment of a computer system that secures data stored on a hard disk of the computer system in accordance with the present invention.

FIG. 1 is a diagram that schematically shows construction of a preferred embodiment of a computer according to the present invention. As shown in FIG. 1, a computer system 100 is capable of implementing a method or apparatus that secures data stored on a hard disk of the computer system in accordance with the present invention. As shown in FIG. 1, the computer system 100 can include a read only memory (ROM) 10 for storing a basic input/output system (BIOS) program, various application programs and an operating system program. A data input interface 11 is coupled with input devices for input of data, such as by a user using a keyboard, a mouse and the like. A hard disk drive (HDD) 30 is an exemplary auxiliary storage unit for storing data (e.g., documents, etc.) inputted under control of the user, for example, through the use of the input devices by the user. The HDD 30 preferably includes a ROM 31 for storing firmware with a data conversion function, and a nonvolatile random access memory (RAM) 32 for registering and storing a password entered and set by the user. A video adapter 40 can convert various data into video signals to output and display the data on a monitor 200. A central processing unit (CPU) 20 preferably performs a system control function according to the BIOS program stored in the ROM 10. The BIOS program stored in the ROM 10 is a sub-program of the operating system for controlling the computer system 100 and peripheral devices and can be composed of a set of basic computer routines with a lowest-level interface for control of devices such as a system clock, a video display, disk drives, a keyboard, etc.

Figure 2A:
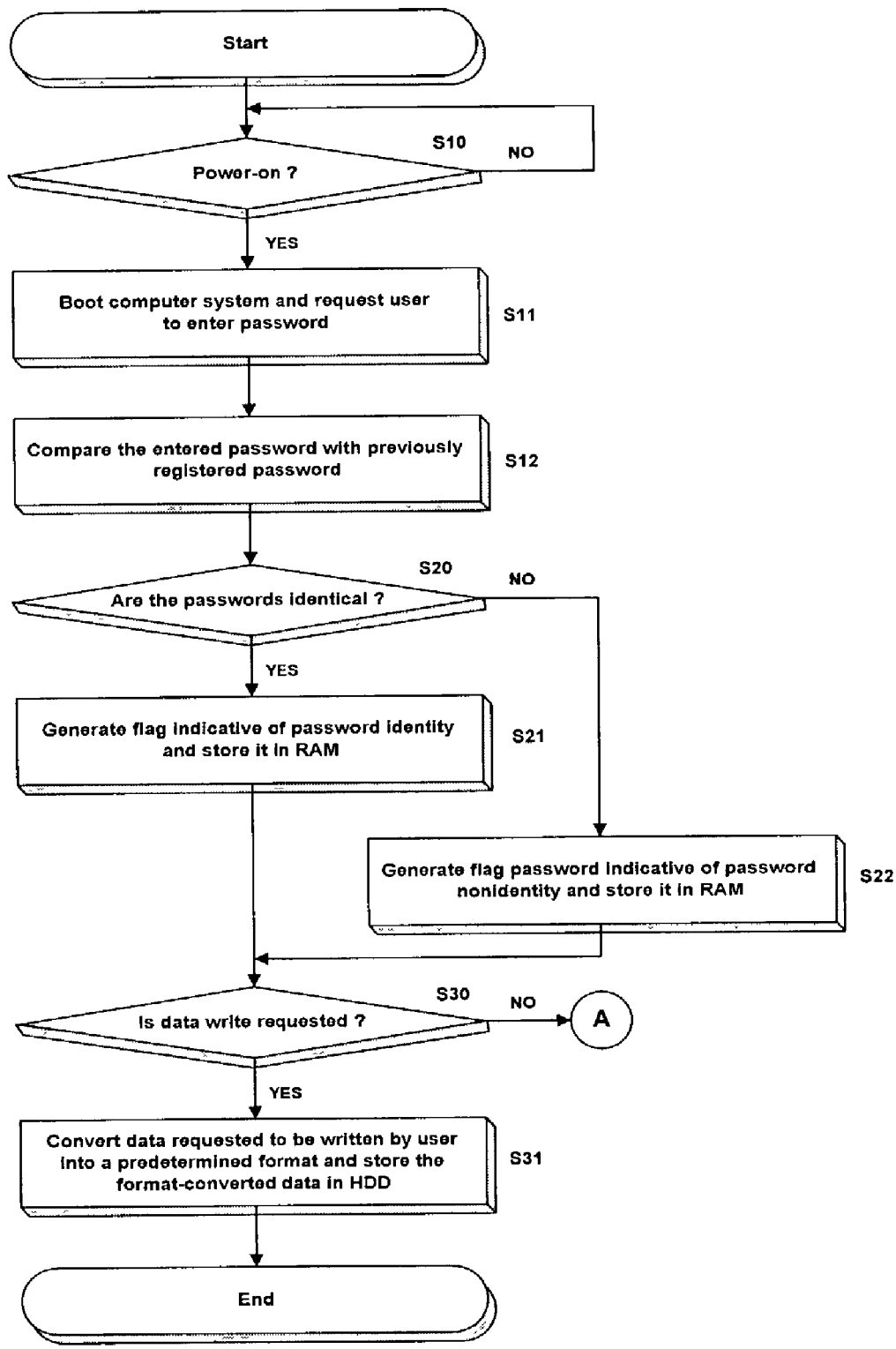
FIGS. 2a and 2b are flow charts illustrating a preferred embodiment of a method for securing data stored on a storage device such as a hard disk of a computer system in accordance with the present invention.
Figure 2B:
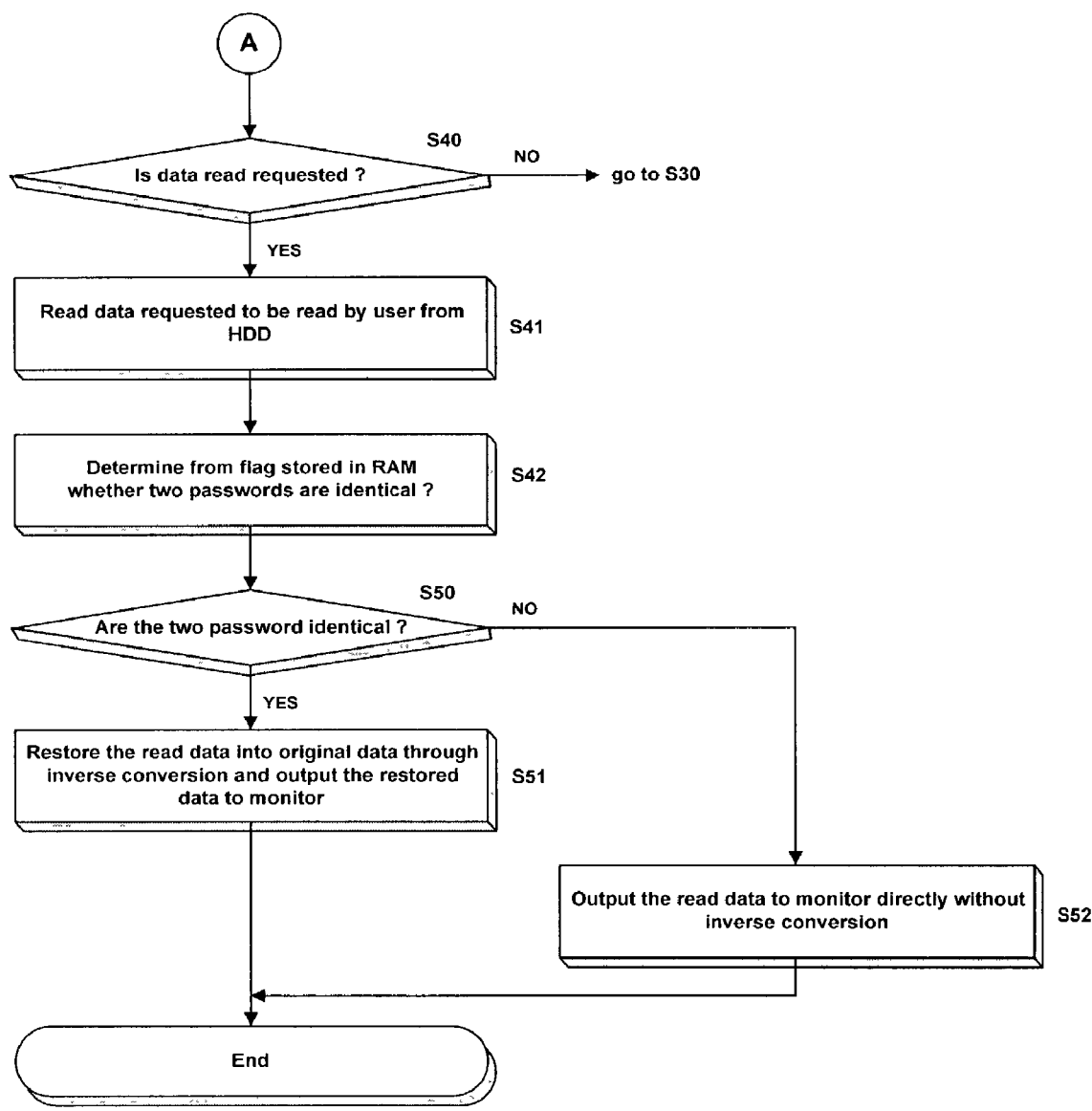

FIGS. 2a and 2b are flow charts illustrating a preferred embodiment of a method for securing the data stored on a storage device such as a hard disk of a computer system in accordance with the present invention. The preferred embodiment of a method for securing data as shown in FIGS. 2a and 2b according to the present invention can be implemented and will be described with reference to the system of FIG. 1. However, the present invention is not intended to be so limited.

First, if the user requests password registration through an input device under the condition that the computer system 100 is powered on, this password registration request may be transferred to the CPU 20 via the data input interface 11. In response to the password registration request, the CPU 20 runs the BIOS program preferably along with a password registration program, among the application programs stored in the ROM 10. As the password registration program is run, preferably a password entry window is outputted to the monitor 200 through the video adapter 40.

As a result, the user enters a password in the password entry window using the input device, and the entered user's password can be stored in the nonvolatile RAM 32 of the HDD 30 under the control of the executing BIOS program. However, the present invention is not intended to be so limited as other procedures can be used to store the password into the RAM 32 or the like.

As shown in FIG. 2a, after a process starts under the condition that the password entered and set by the user is registered and stored as described above, the computer system 100 is powered on if the user pushes a power button of the system 100 (step S10). The BIOS program in the ROM 10 preferably performs a power-on self-test (POST) operation for booting of the computer system 100. The POST operation is performed to carry out a series of tests for inspecting and initializing respective states of devices constituting the computer system 100 upon application of power to the system to enable the normal operation of the computer system 100. Thus the POST operation can perform self-tests after power-on, report state information and error information and the like.

If the POST operation is completed, the BIOS program outputs a password entry request such as the password entry window to the monitor 200 through the video adapter 40 to request the user to enter a password (step S11). In the case where a password entered by the user is inputted via the data input interface 11 in response to the password entry request, the CPU 20 receives the entered password and compares it with the password previously registered and stored in the nonvolatile RAM 32 of the HDD 30 to determine whether the two passwords are the same or correspond (step S12).

In the case where the two passwords are determined to be the same (e.g., correspond) as a result of the comparison (step S20), the BIOS program can generate a signal or flag indicative of password identity and stores the generated flag in the nonvolatile RAM 32 of the HDD 30 (step S21). However, if the two passwords are determined not to be the same (e.g., correspond) as a result of the comparison (step S20), the BIOS program can generates a signal or flag indicative of password nonidentity and stores the generated flag in the nonvolatile RAM 32 of the HDD 30 (step S22).

Under the condition that the generated flag is stored in the nonvolatile RAM 32 of the HDD 30 in the above manner, if the computer system 100 completes power on operations after the computer system 100 performs other task according to request of the user and then is powered off by the user, preferably the flag stored in the nonvolatile RAM 32 of the HDD 30 is automatically converted to the state indicative of password nonidentity such as by the firmware stored in the ROM 31 of the HDD 30. Thereafter, procedures of the steps S11, S12, S20, S21, S22 are successively executed and can be repeated for each power on of the computer system 100.

On the other hand, if the user requests a data write operation of the HDD 30 via the data input interface 11 under the condition that the flag indicative of the password identity is generated and stored in the nonvolatile RAM 32, the CPU 20 preferably runs the firmware stored in the ROM 31 of the HDD 30 such that the run firmware converts the format of data requested to be written by the user into a predetermined format (e.g., encrypted for security) and stores the resulting data in a corresponding data storage area of the HDD (steps S30 and S31). This data conversion can be processed in the unit of sector data by an encryption program of the firmware stored in the ROM 31 of the HDD 30.

If the user requests a data read operation of the HDD 30 via the data input interface 11 under the condition that the data requested to be written by the user is format-converted and stored in the HDD 30 as described above, the CPU 20 runs the firmware stored in the ROM 31 such that the run firmware reads data requested to be read by the user from the HDD 30 (steps S40 and S41). This read data is preferably data format-converted (e.g., encoded) as described above. Subsequently, the firmware (or BIOS program) checks the flag indicative of the password identity or nonidentity prestored in the RAM 32 to determine whether the two passwords correspond or are the same (step S42).

Upon determining from the flag that the two passwords correspond or are the same, the firmware (or BIOS program) performs a data inverse-conversion operation to restore the read data into the original data (e.g., decrypted format), and the CPU 20 outputs the restored data to the monitor 200 through the video adapter 40 (steps S50 and S51).

However, in the case where it is determined from the flag that the two passwords are not the same (step S50), the firmware (or BIOS program or the like) does not perform the data inverse-conversion operation with respect to the read data, so the CPU 20 outputs the read data to the monitor 200 through the video adapter 40 as it is (steps S50 and S51). In this manner, if the user is an unauthorized person, the format-converted data is outputted to the monitor 200 through the video adapter 40 directly as it remains converted in format (e.g., encrypted), without being inversely converted into the original data. As described above, a security function is carried out to prevent the unauthorized user from interpreting the data stored in the HDD 30.

As described above in FIG. 1, preferred embodiments according to the present invention are described using a computer and a hard disk. However, the present invention is not intended to be so limited. For example, preferred embodiments according to the present invention can be used to protect stored data in a detachable storage device or memory and implemented in a portable computer, data processing apparatus, server, PDA or notebook computer.

In addition, in the preferred embodiments according to the present invention, the format conversion of data requested to be written may be selectively made according to the user's discretion and the enhanced security function. Also, data access requests (e.g., read or write) by a user for storage devices in the system could be selectively performed or denied based on a password identity status (e.g., authorized user).

Further, in preferred embodiments, the password verification was entered on booting the system. However, such verification (e.g., user) could be performed periodically or even with each data access request (e.g., read or write). The password verification as shown in FIG. 2a determines if the passwords are identical, however, a known correspondence of passwords such as binary conversion of a number can also be used. Similarly, other password entry methods could be implemented such as a single authorization loading or authorizing data access applications, which can be used for accessing stored data into the system. In addition, security or password information can include machine or hardware specific information (e.g., serial number of CPU, etc.). Further, the security or password information can be one of user codes, biometric information, hardware identification numbers, data received via encoded smart cards and registration numbers.

As described above, preferred embodiments according to the present invention can provide a method for securing data stored on a hard disk of a computer system, which is capable of reducing or preventing unauthorized access and can provide increased security for the data stored on the hard disk.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A system, comprising:
a processor that operates application programs; and
a removable storage device coupled to the processor and configured to store data accessible to the processor, wherein the removable storage device is provided a second password using the processor, wherein the removable storage device stores data in an encrypted format upon a write data access request, wherein the removable storage device outputs decrypted data responsive to a read data access request when a first password corresponds to the second password, and wherein the removable storage device outputs the encrypted data responsive to the read data access request when the first password does not correspond to the second password.

2. The system of claim 1, wherein the first password and second password are the same.

3. The system of claim 1, wherein the first and second passwords are different.

4. The system of claim 1, wherein the removable storage device is a hard disk drive and the processor is part of a CPU of a portable computer.

5. The system of claim 1, wherein the removable storage device is configured to store the second password, and wherein the passwords are one of user codes, biometric information, hardware identification numbers, data received via encoded smart cards and registration numbers.

6. A method for securing data stored on a hard disk of a computer system, comprising:
a) requesting a user to enter a password when a password for security of said computer system is previously registered, wherein data to be written to the hard disk is converted into a specific format for security when stored on said hard disk of said computer system;
b) determining whether said password entered by said user is the same as said previously registered security password and storing the determined result;
c) reading the data stored on said hard disk in said specific format for security if said user requests it to be read from said hard disk; and
d) processing the read data in different manners according to the determined result, wherein a first manner of processing the data access request responds to a read data access request by outputting decrypted data from the hard disk and responds to a write data access request by storing corresponding data on the hard disk in an encrypted format, and wherein a second manner of processing the data access request responds to the read data access request by outputting encrypted data.

7. The method of claim 6, wherein the determined result is stored in the form of a flag, and wherein the hard disk is the hard disk of the computer system.

8. The method of claim 7, wherein when the stored flag indicates password identity, performing a data conversion operation with respect to said read data to restore said read data to an original data from said specific format for security, and displaying the restored original data on a monitor.

9. The method of claim 6, wherein if the determined result indicates password consistency, responding to said read data access request by outputting said decrypted data from the hard disk and responding to said write data access request by storing corresponding data on the hard disk in said encrypted format.

10. The method of claim 9, wherein if the determined result indicates password inconsistency, responding to said read data access request using said encrypted data and responding to a write data access request by not storing corresponding data on the hard disk, wherein the computer system is a notebook computer.

11. The method of claim 6, wherein if the determined result indicates password inconsistency, responding to said write data access request by not processing said data access request.

12. A method for securing data stored on a hard disk of a portable computer system, comprising:
providing a display unit of the portable computer system having a display module;
providing a main unit rotatably coupled to the display unit to move between an open position and a closed position of the portable computer system, wherein the main unit includes a user input device that includes a keyboard style device and a processor coupled to the hard disk and mounted on a main board, wherein the processor operates an operating system and application program that output data for display to a user on the display module;

converting data requested to be written by the user into a predetermined format for security when the user requests a write operation after booting of said portable computer system is completed; and storing the security format-converted data on said hard disk of said portable computer system itself, wherein the hard disk is coupled to the main board of the portable computer system, wherein the hard disk is not a removable storage device or a removable memory card, wherein the hard disk stores said data in an encrypted format upon a write data access request and outputs said data in a decrypted format responsive to a read data access request when a user password corresponds to a password provided to said hard disk, and wherein the hard disk outputs the encrypted data responsive to the read data access request when the user password does not correspond to the hard disk password.

13. The method of claim 12, wherein the format conversion is selectively performed based on matching a password stored to allow access to the hard disk.

14. The method of claim 12, wherein said portable computer is a notebook computer.

15. A method, comprising:
enabling a computer system;
entering a user password;
selectively accessing encoded data stored in a first format in a detachable storage device; and
outputting said data converted to a second format when a security code for the detachable storage device is matched, wherein the detachable storage device stores said data in an encrypted format as the first format upon a write data access request and outputs said data in a decrypted format as the second format responsive to a read data access request when the user password corresponds to the security code, and wherein the detachable storage device outputs the encrypted data responsive to the read data access request when the entered user password does not correspond to the security code.

16. The method of claim 15, comprising:
requesting a password responsive to a data access request of the detachable storage device;
determining whether said password corresponds to the security code; and
processing the data access request when the password corresponds to the registered security code.

17. The method of claim 16, comprising registering the security code by a processor of the computer system.

18. The method of claim 15, wherein the computer system is a notebook computer and the detachable storage device is a hard disk in the host notebook computer itself, wherein the security code is registered by a CPU of the notebook computer, wherein the password matches the security code when the password is equal to the security code.

* * * * *